H. R. FARNSWORTH.
DIE STOCK.
APPLICATION FILED NOV. 20, 1909.
994,731.
Patented June 13, 1911.
2 SHEETS—SHEET 1.
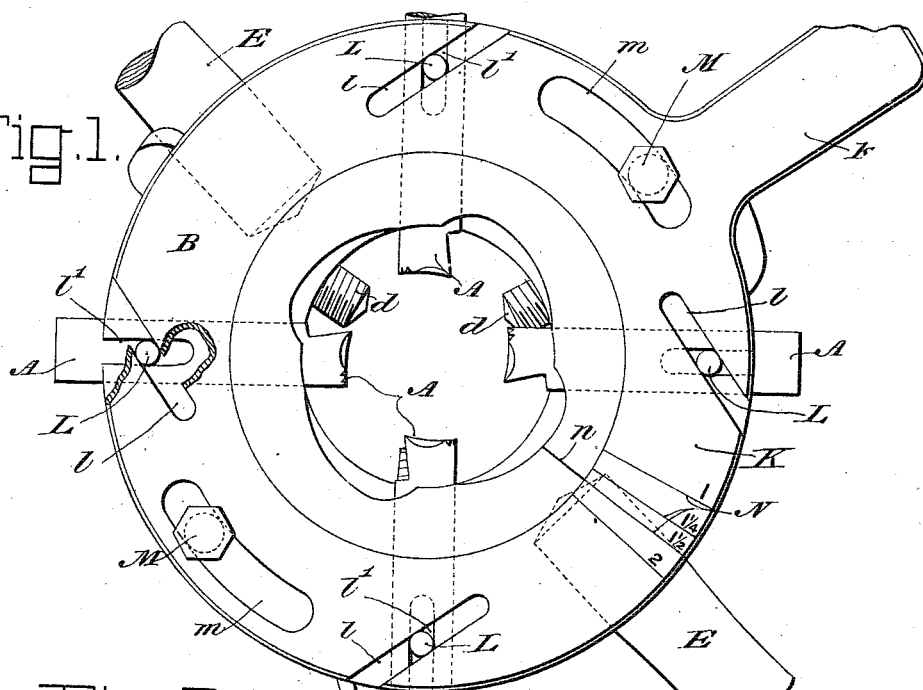
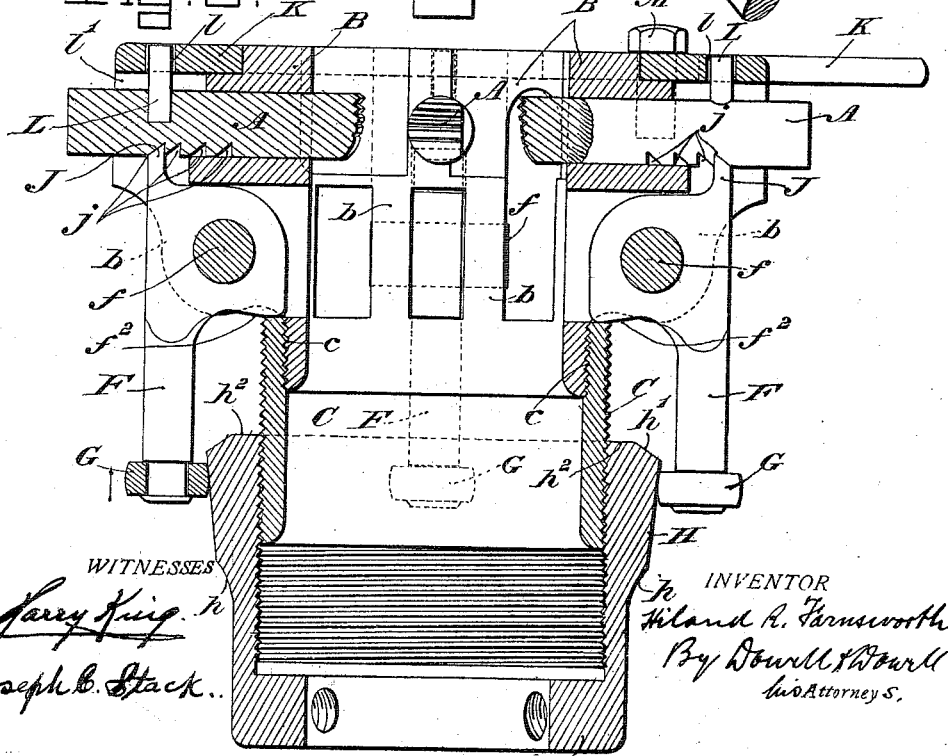
WITNESSES
INVENTOR
Hiland R. Farnsworth
By Dowell & Dowell
his Attorneys H. R. FARNSWORTH.
DIE STOCK.
APPLICATION FILED NOV. 20, 1909.
994,731.
Patented June 13, 1911.
2 SHEETS—SHEET 2.
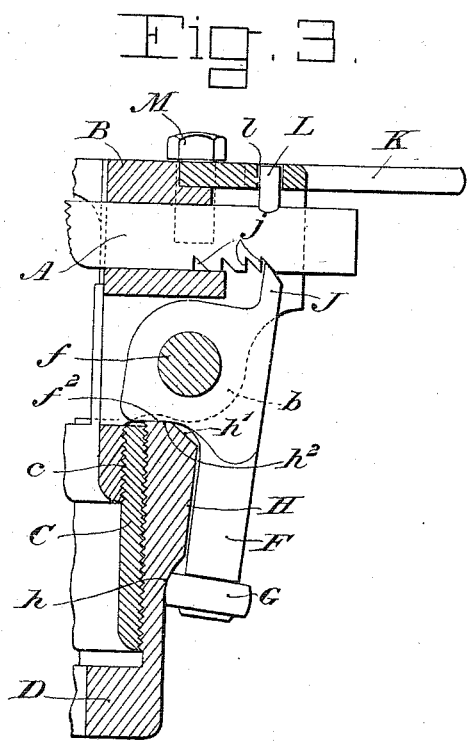
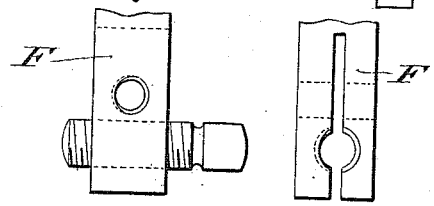
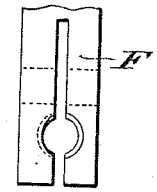

UNITED STATES PATENT OFFICE.

HILAND R. FARNSWORTH, OF SANDUSKY, OHIO, ASSIGNOR TO THE THREADING MACHINE COMPANY, OF SANDUSKY, OHIO, A CORPORATION OF OHIO.

DIE-STOCK.

994,731.     Specification of Letters Patent.     Patented June 13, 1911.

Application filed November 20, 1909. Serial No. 529,143.

*To all whom it may concern:*

Be it known that I, HILAND R. FARNSWORTH, a citizen of the United States, residing at Sandusky, in the county of Erie and State of Ohio, have invented certain new and useful Improvements in Die-Stocks, of which the following is a specification.

My invention relates to apparatus for cutting screw-threads on pipes, rods or other articles, and more particularly to a machine for cutting tapered threads.

The principal feature of the invention is that the dies or chasers may be simultaneously adjusted, by a simple movement, either to regulate the depth of the cut or to permit operation with the same set of dies on work of different diameters, while yet the machine is adapted for cutting a tapered thread. The dies are also automatically released from the work upon completion of the operation, and are reset by the reverse feed or return of the die carrying-head to starting position.

The invention further includes certain minor improvements in mechanical details, as will be hereinafter described.

A machine embodying my invention is illustrated in the accompanying drawings, which form a part of this specification.

The invention will be first described with reference to the drawings and then more particularly pointed out in the claims appended hereto.

In said drawings: Figure 1 is a plan or face view of the pipe-threader. Fig. 2 is a central longitudinal section. Fig. 3 is a like section through a side of the machine showing the die brought to work-releasing position. Figs. 4 and 5 are side and front views of a set-screw and micrometer adjustment that may be substituted for the rollers G at the lower ends of the levers F.

In the illustrated machine, radially-movable dies or chasers A work in guide-ways or slots therefor in an annular die-carrying head B. The latter has a tubular feed-screw C threaded to a work-guide or work-holder D, in which the pipe or other object to be threaded may be centered and clamped by set screws *d* in the usual manner. For revolving the die-head, it may be driven by any suitable means such as is employed in the art, being shown provided with lateral handles E.

Attached to the die-head, below the respective dies or chasers, are a corresponding number of levers F. These are shown fulcrumed on the pins *f* between ears or lugs *b* on the die-head. Considering the outer face of the die-head as the top of the machine, the levers F hang downward and are or may be provided with rollers G, preferably having rounded peripheries, which rollers engage a tapered or conical surface H on the work-holder. The said conical surface tapers toward the lower end of the work-holder and terminates in a curved turned down portion *h*. Its upper end has a turned down bevel $h^1$ and preferably a flat top $h^2$.

The upper ends of the levers, above their fulcrums, are provided each with a tooth J, which engage saw or rack teeth *j* milled on the bottom sides of the dies or chasers. The teeth are shown shaped as saw or ratchet teeth, with the roots of the teeth arranged toward the center of the machine, so that in operation the outward thrust on the dies is sustained by the teeth J and indirectly by the tapered or conical surface H on the work-holder with which the rollers G of the levers F contact. The diameter of the thread being cut is of course determined by the engagement of the teeth J with the teeth or notches *j*, the dies being adjustable inward and outward for engagement of the rack teeth with the teeth on the levers at different points. The rack teeth might be provided on the levers and a single tooth or notch might be formed on the underside of the dies for engagement therewith.

For adjusting the dies to regulate the diameter of the cut, or to accommodate the machine to work of different sizes, an adjusting ring K, having a handle *k*, is rotatably-fitted around a central boss or in an annular seat or counterbore on the upper or outer face of the die-head, and is provided with oblique slots *l* which slidably engage pins or studs L on the dies, so that by turning the adjusting-ring (only when the levers F are disengaged from the dies as hereinafter explained) the dies will be moved inward or outward by engagement with the oblique slots; and during the thread-cutting operation the ring will turn sufficiently to permit the gradual radial movement of the dies effected by the conical surface H. The die-head is provided with radial slots $l^1$ to allow for movement of pins L. To hold the adjusting-ring in place, that is to prevent it from falling off, cap-screws or shoulder-screws M are or may be tapped into the die-head, without however clamping or binding the ring, said screws passing through segmental slots $m$ in the adjusting-ring. A scale N may be provided either upon the adjusting ring or upon the face of the die-head, and an index $n$ may be provided on the other member.

In operation, the dies being adjusted for cutting a thread of the required diameter, and the pipe or other object being secured in place, the die-head is revolved so as to feed the dies axially on the work, and the outward thrust of the dies due to the resistance of the work is sustained by the levers F whose rollers G contact with the tapered or conical surface H, so that, as the operation progresses, and as the rollers move down the said tapered surface, the dies are permitted to have a gradual outward movement as required to cut a tapered thread; and, finally, as the rollers G leave the conical surface H and pass onto the turned down portion $h$ of the cone, the dies are released from the work so that the pipe or other object may be withdrawn. Positive throw-out of the dies is effected as shown in Fig. 3, by the under sides $f^2$ of the butts of the levers coming in contact with the top surface $h^2$ of the work-holder; and as will be seen the throw out of the dies does not disengage the teeth J of the levers from the teeth $j$ or notches in the under sides of the dies to loose the adjustment or change the working diameter. By the reverse feed the rollers are again brought in contact with the conical surface and reset the dies.

During the thread-cutting operation, or while the rollers are in contact with the conical surface H, as well as in the position shown in Fig. 3, the dies may not be adjusted by the adjusting-ring K; but the die-head must first be run up to a point where the rollers G run off of the cone at the bevel $h^1$, which releases the levers from the dies, and the dies can then be adjusted by turning the adjusting-ring. Then when the die-head is revolved so as to bring the rollers back upon the conical surface H, the levers will be brought back into engagement with the rack teeth on the dies. Instead of the rollers G, the lower ends of the levers may be provided with non-rotatable surfaces in sliding engagement with the cone H, and the latter may be a separate sleeve or shell rotatably-mounted on the work-holder; though I prefer the construction shown which is claimed as a feature of my invention. A set screw and micrometer adjustment may be used in place of the rollers for regulating the depth of cutting.

It will be noted from Fig. 2 that the dies or chasers and the slots in which they move are round, which results in economical manufacture of the die-head, since slots may be bored with a drill. The dies are prevented from turning by the flats at the roots of the teeth, and also by the pins or studs L working in the slots $l^1$. A spline or key could be inserted to prevent turning. Another advantageous feature is that the lead screw C is an independent element so that it can be easily renewed at a minimum cost. The screw C is shown screwed to a threaded portion $c$ on the lower end of the die-head proper, and may be secured rigidly in any appropriate way as by a key, transverse screw, or by coating the threads $c$ with some adhesive substance.

I claim as my invention and desire to secure by Letters Patent:

1. In a thread-cutting machine, the combination of a work-holder and a die-carrying head, radially-movable dies carried by the latter, instrumentalities for holding the dies to the work, means on the work-holder in contact with and traversed by said instrumentalities at an incline to the axis of the machine, thereby sustaining the end thrust of the dies while permitting gradual radial adjustment as required to cut a tapered screw, the dies being adjustably-engaged by said instrumentalities, and means for simultaneously adjusting the dies relative thereto for regulating the diameter of the cut, said means being operable when said instrumentalities are released from contact with the work-holder.

2. In a thread-cutting machine, the combination of a work-holder and a die-carrying head, radially-movable dies carried by the latter, the work-holder being provided with a tapered or conical surface, die-controlling instrumentalities carried by the die-head and in contact with said surface for allowing gradual radial adjustment of the dies as required to cut a tapered thread, and an adjusting device engaging the dies and operable when said instrumentalities are released from said surface to simultaneously adjust the dies relative to said instrumentalities for regulating the diameter of the cut.

3. In a thread-cutting machine, the combination of a work-holder and a die-carrying head, radially-movable dies carried by the latter, the work-holder being provided with a tapered or conical surface, die-controlling instrumentalities movably-attached to the die-head and adjustably-engaging the dies, said instrumentalities contacting with said tapered or conical surface for controlling the gradual radial movement of the dies as required to cut a tapered thread, said conical surface having a turned down end or ends for releasing said instrumentalities, and an adjusting-member having oblique slidable-connections with the dies for adjusting them relative to said instrumentalities when the latter are off the said conical surface.

4. In a thread-cutting machine, the combination of a work-holder and a die-carrying head, radially-movable dies carried by the latter, levers fulcrumed to the die-head and adjustably-engaging the dies, an adjusting-ring rotatably-secured on the die-head having connections with the respective dies through pins and oblique slots, whereby the dies are adjustable with reference to their engagement with said levers, and a tapered or conical surface provided on the work-holder with which said levers are adapted to contact for holding the dies to their work while allowing gradual radial adjustment as required to cut a tapered thread, said ring being operable for adjusting the dies when said levers are off said tapered surface.

5. In a thread-cutting machine, the combination of a work-holder and a die-carrying head, radially movable dies carried by the latter, a tapered or conical surface provided on the work-holder, levers fulcrumed on the die-head and adapted to contact with said surface, and adjustable means of engagement between the dies and the respective levers consisting of a plurality of teeth on one and a coöperating tooth on the other.

In testimony whereof I affix my signature, in presence of two witnesses.

HILAND R. FARNSWORTH.

Witnesses:
SIDNEY FROHMAN,
WM. F. HERBRECHT.

---

Copies of this patent may be obtained for five cents each, by addressing the "Commissioner of Patents, Washington, D. C."